(12) United States Patent
Simpson et al.

(10) Patent No.: US 6,623,390 B2
(45) Date of Patent: Sep. 23, 2003

(54) HYDRAULIC TENSIONER WITH PIVOTAL MOUNT

(75) Inventors: Roger T. Simpson, Ithaca, NY (US); Franklin R. Smith, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 09/952,816

(22) Filed: Sep. 14, 2001

(65) Prior Publication Data

US 2002/0006841 A1 Jan. 17, 2002

Related U.S. Application Data

(62) Division of application No. 09/387,781, filed on Sep. 1, 1999, now Pat. No. 6,312,351.
(60) Provisional application No. 60/101,215, filed on Sep. 21, 1998.

(51) Int. Cl.⁷ .................. F16H 7/08; F16H 7/22
(52) U.S. Cl. ............ 474/110; 474/109; 474/111
(58) Field of Search .................. 474/110, 111, 474/109, 138, 113, 140, 136, 137

(56) References Cited

U.S. PATENT DOCUMENTS

| 4,976,660 A | 12/1990 | Breind |
| 5,002,023 A | 3/1991 | Butterfield et al. |
| 5,026,330 A | 6/1991 | Zermati et al. |
| 5,653,653 A | 8/1997 | Ledvina |
| 5,658,212 A | * 8/1997 | Meurer et al. .............. 474/110 |
| 5,718,650 A | 2/1998 | Smith et al. |
| 5,746,673 A | 5/1998 | Polster et al. |
| 5,782,625 A | * 7/1998 | Young ......................... 474/110 |
| 5,797,817 A | * 8/1998 | Senftleben et al. ......... 474/110 |
| 5,833,220 A | * 11/1998 | Nakakubo et al. .......... 474/110 |
| 5,989,139 A | 11/1999 | Dusinberre et al. |
| 6,036,612 A | 3/2000 | Katogi et al. |
| 6,106,424 A | 8/2000 | Kratz |
| 6,120,402 A | 9/2000 | Preston et al. |
| 6,244,982 B1 | * 6/2001 | Merelli ....................... 474/138 |

FOREIGN PATENT DOCUMENTS

| DE | 195 00 940 C1 | 7/1996 |
| DE | 198 02 886 A1 | 7/1999 |
| EP | 0 877 180 A2 | 11/1998 |
| EP | 0877 180 A3 | 10/2000 |
| GB | 2 307 022 A | 5/1997 |
| WO | WO 96/36823 | 11/1996 |

* cited by examiner

Primary Examiner—Marcus Charles
(74) Attorney, Agent, or Firm—Fitch, Even, Tabin & Flannery; Greg Dziegielewski

(57) ABSTRACT

A hydraulic tensioner includes a piston that is pivotally mounted to a tensioner arm. The piston is slidably received within a hollow body that is pivotally mounted to a mounting block or engine. In different embodiments, the body is mounted to the tensioner arm while the piston is biased against the mounting block or pivotally connected to the mounting block or engine.

19 Claims, 8 Drawing Sheets

SECTION A-A

SECTION B-B

HYDRAULIC TENSIONER WITH PIVOTAL MOUNT

CROSS REFERENCE TO RELATED APPLICATION

This is a division, of prior application Ser. No. 09/387,781, now U.S. Pat. No. 6,312,351, filed Sep. 1, 1999, which is hereby incorporated herein by reference in its entirety.

This application claims benefit of provisional application U.S. Ser. No. 60/101,215, filed Sep. 21, 1998.

BACKGROUND OF THE INVENTION

This invention relates to a hydraulic tensioner having a piston and body or sleeve pivotally mounted to a tensioner arm and tensioner housing. More particularly, the present invention relates to a hydraulic tensioner in which a first end of the tensioner is pinned or pivotally mounted to a tensioner arm while the second end of the tensioner body, located opposite the first end, is pivotally mounted to an engine block or other mounting block.

Hydraulic tensioners are typically used as a control device for a chain drive system in an automobile timing system. The tension in the chain can vary greatly due to the wide variation in the temperature and the linear thermal expansion among the various parts of the engine. Moreover, wear to the chain components during prolonged use can produce a decrease in the tension of the chain.

A hydraulic tensioner is conventionally used to take up the slack in the chain that connects the crankshaft to the camshaft in an engine timing system. The typical hydraulic tensioner includes a housing with a bore, a hollow piston slidably received in the bore and a fluid chamber defined by the piston and the bore. The piston is biased in a protruding direction from the bore by a spring. A check valve is also included in the hydraulic tensioner to permit fluid flow from a source of pressurized fluid into the fluid chamber, while preventing back flow in the reverse direction. The piston is typically pressed against a tensioner arm or other device to provide tension to the chain. The force of the chain against the piston in an inward direction is balanced by the resistance force of the fluid and force of the spring in an outward direction.

In one embodiment, the present invention provides a hydraulic tensioner that has a piston pivotally connected to a tensioner arm at one end and a spherically-shaped sleeve or body at the other end. The spherically-shaped body incorporates an oil feed from a ball and socket inlet port. The oil feed inlet port is mounted to an engine head or block.

SUMMARY OF THE INVENTION

The present invention is directed to a pivoting hydraulic tensioner with an integral mounting feature and oil feed. In one embodiment, a hydraulic tensioner includes a body formed of a generally cylindrical hollow sleeve with a spherically-shaped lower end. The lower end includes a fluid passage to permit fluid flow into the hollow sleeve. A hollow piston having a closed end and an open end is slidably received within the hollow sleeve. The open end of the piston is positioned in the sleeve to form a fluid chamber with the sleeve.

A spring is also positioned within the hollow piston to bias the piston in a protruding direction from the sleeve. A check valve is also positioned within the fluid passage between the chamber and a source of pressurized fluid to permit fluid flow into the fluid chamber while blocking flow in the reverse direction. As the chain slackens, the force of the spring moves the piston away from the base of the sleeve and fluid is caused to flow into the fluid chamber. As the chain tightens, the force of the chain inward against the piston is balanced by the force of the spring and the resistance force of the fluid chamber.

The piston is pivotally connected at the closed end to permit attachment to a tensioner arm. A pivot pin disposed with the pivot connection permits pivotal mounting of the tensioner arm. The spherically-shaped end of the sleeve is also received or held in a spherically-shaped body, which is mounted to an engine block. The spherically-shaped body provides a fluid passage from the source of pressurized fluid to the fluid passage in the sleeve.

In another embodiment, the spherically-shaped body is located within a tensioner housing. In yet another embodiment, the sleeve is pivotally connected to the tensioner arm and the piston has a spherically-shaped end that is held in the mounting block. A retaining ring is placed along the outside of the piston. The retaining ring fits into a groove machined into the sleeve when the piston reaches its uppermost point, that is, the point furthest out of the sleeve, and prevents further outward movement.

Fluid is supplied by a reservoir and flows through a passageway to the check valve and into the pressurized chamber. To produce a pressure differential, a compression spring is commonly used to provide a bias force on the tensioner piston. This produces a vacuum in the chamber as the piston is urged away from the check valve and permits flow through the valve into the chamber. As the chain slackens and tightens, the piston protrudes and withdraws in response to the vibration of the chain. The outward force of the spring and fluid on the piston balances the inward force of the chain on the piston.

In yet another embodiment, the tensioner has a mounting hole formed in a bottom end of the sleeve of the tensioner opposite the open end of the sleeve. A mounting pin is inserted into the mounting hole of the tensioner. The mounting pin allows pivoting of the tensioner housing around the central axis of the pin. In other words, the mounting pin limits the rotational direction of the tensioner to a plane perpendicular to the longitudinal axis of the pin. The mounting pin may be an integral part of a mounting plate fastened to the engine or may be part of a separate mounting pin assembly fastened to the engine. The mounting pin may have retaining clips or other fastening means to keep the tensioner body mounted upon the pin. In addition, the mounting pin may have O-rings positioned around the shaft of the pin to provide a fluid seal between the pin and the tensioner.

In all embodiments of the present invention, the end of the tensioner in contact with the tensioner arm is allowed to pivot relative to the tensioner arm and the other end of the tensioner in contact with a mounting block or mounting pin attached to the engine is also allowed to pivot. In other words, the first end, which is the end of the tensioner which contacts the tensioner arm, may be either the piston or sleeve end of the tensioner. The second end, which is the end of the tensioner mounted to the engine block, may be either the piston end or the sleeve end of the tensioner.

DETAILED DESCRIPTION OF THE PREFERRED EMBODIMENTS

Figure 1:
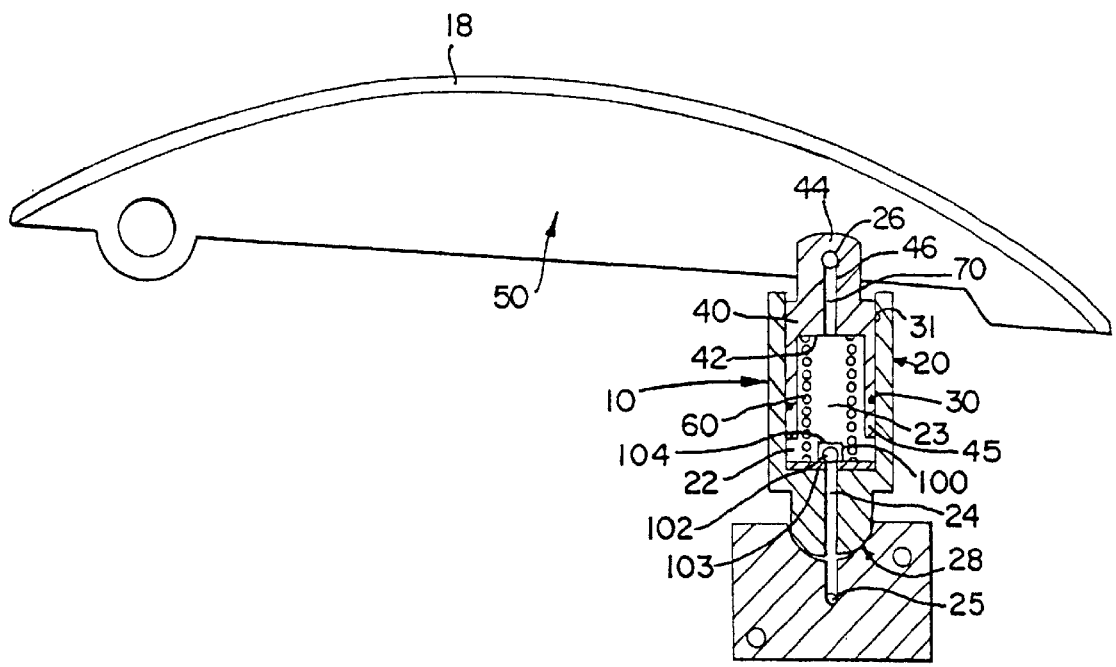
FIG. 1 is a front sectional view of one embodiment of the hydraulic tensioner of the present invention in the retracted position.

FIG. 1 illustrates a first embodiment of the hydraulic tensioner of the present invention. As installed, the tensioner includes a body or sleeve 20 having a hollow center 23. The center forms a fluid chamber that is filled with fluid from a pressurized source of fluid that travels through a passageway 24 from an oil feed 25. The use of a hollow sleeve for a piston bore permits greater control over the internal diameter manufacturing tolerances in contrast to a tensioner formed from cast iron into which a bore is drilled or cut. The sleeve 20 is preferably formed on a lathe or screw machine, which provides greater tolerance control than a typical boring machine.

Figure 2:
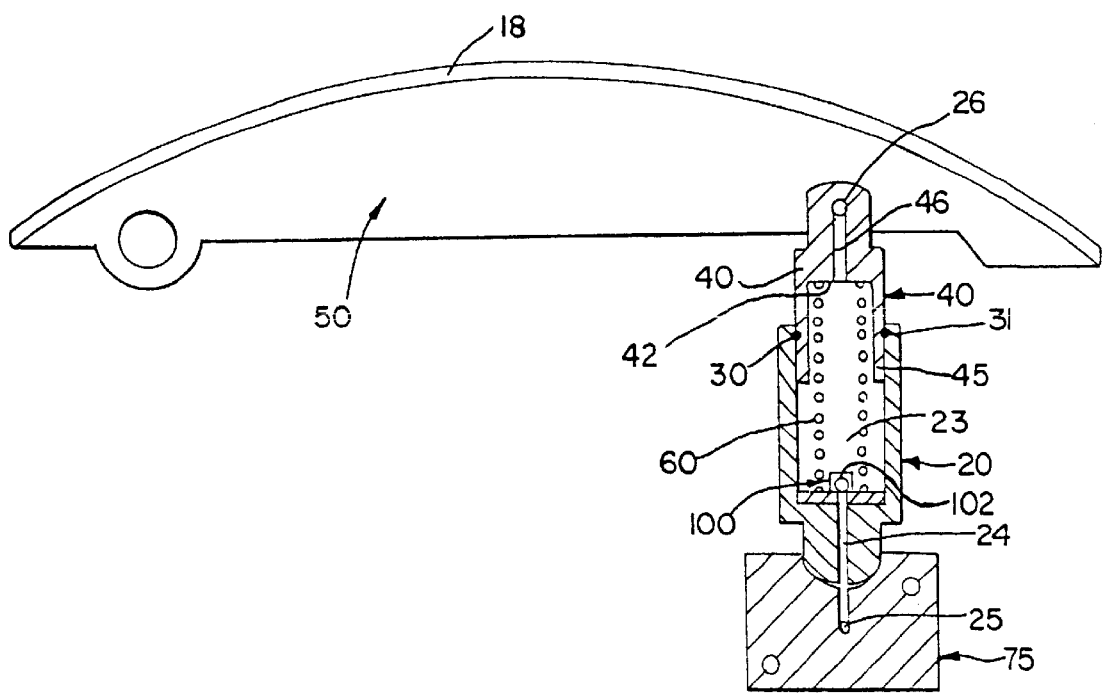
FIG. 2 is a front sectional view of the hydraulic tensioner of FIG. 1 in the extended position.

The sleeve 20 receives a piston, or plunger, 40 in the hollow center 23. The generally cylindrical, hollow piston 40 forms a fluid chamber 23 with the center of the sleeve 20. The piston 40 has an inside 42 and a closed end 44 opposite the open end 45. An aperture 46 is located in the center of the closed upper end 44. A retention ring 30 surrounds the piston 40. As the piston 40 extends, the ring will expand into a groove 31 within the sleeve center 23 and limit the upper or outer movement of the piston 40, as shown in FIG. 2. As a result, the piston 40 will stay within the sleeve 20 at all times.

A spring 60 contacts the inside 42 of the upper end of the piston 40 to bias the piston 40 in a protruding or outward direction from the sleeve 20. A tensioner arm 50 is pivotally mounted to the upper end 44 by a pivot pin 26 to provide tension along a chain strand. The groove or top portion of the arm 18 provides a chain wear surface that is in contact with the chain to be tensioned. Preferably, the top of the arm 18 is arcuately shaped to provide a suitable chain travel surface. Of course, it will be understood by one skilled in the art that the top of the arm 18 can have any suitable shape as dictated by manufacturing concerns.

A check valve 100 is provided between the chamber 20 and the passageway 24 to the oil feed 25 to permit fluid flow into the chamber 20, while blocking back flow in the reverse direction. The check valve 100 includes a ball 102, valve seat 103, and ball retainer 104. During start-up of the hydraulic chain tensioner 10 at normal operating conditions, a low pressure condition is created in the chamber 23, which causes fluid to enter through check valve 100 and passageway 24 and fills up the chamber 23. The pressure differential across the check valve 100 opens the valve and allows fluid flow into the chamber 23. The piston 40 is shown in an extended position in FIG. 2. When the chamber 23 fills, and the piston is pushed inward by the chain, the check valve 100 closes and prevents flow in the reverse direction out of the chamber 23. During operation, the force of the chain against the piston 40 is balanced by the force of the spring 60 and the pressurized fluid in the chamber 23.

The tensioner 10 also includes a vent 70 that can be formed from sintered powdered metal, an alloy of stainless steel, bronze, Monel, Iconel, Carpenter 20 or nickel, as known in the powder metallurgy art. The sintered powdered metal is in the form of a porous cake. The vent permits air to escape from the top of the chamber, but prevents flow of large quantities of oil out of the tip of the chamber and piston.

The tensioner 10 includes a source or reservoir of fluid, such as oil, at the inlet to the tensioner 10 such that it can draw oil from this reservoir to fill the chamber.

Figure 3:
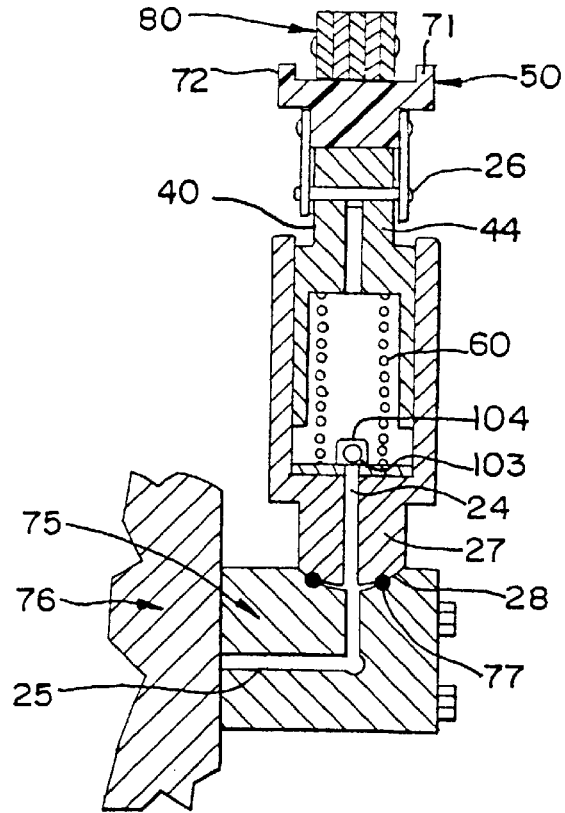
FIG. 3 is a side sectional view of the hydraulic tensioner of FIG. 1 contacting a mounting block that is attached to the engine.

In FIG. 3, a side view of the first embodiment of the present invention is shown. The chain 80 is guided by tensioner arm 50, which has raised sides 71 and 72. The pivot pin 26 pivotally connects the tensioner or guide arm 50 to the upper end 44 of the piston 40. At the other end, the spherically-shaped end of the sleeve contacts a mounting block 75, which is attached to the engine (shown schematically at 76). Oil feed 25 passes from the engine 76 through the mounting block 75 and into passageway 24 in the closed end of the sleeve. The mounting block 75 may incorporate an oil reservoir for the tensioner to draw in oil during start-up or low oil pressure conditions.

The bottom 27 of the sleeve is in the shape of a sphere so that it fits into a corresponding spherical mounting receptacle 28. An O-ring seal 77 may be included between the bottom 27 of the tensioner and the mounting receptacle 28, as shown in FIG. 3. As an alternative to the tensioner being mounted onto the mounting block 75, the tensioner 10 may be mounted directly onto the engine 76, with the oil feed running directly through the engine into passageway 24.

Figure 4:
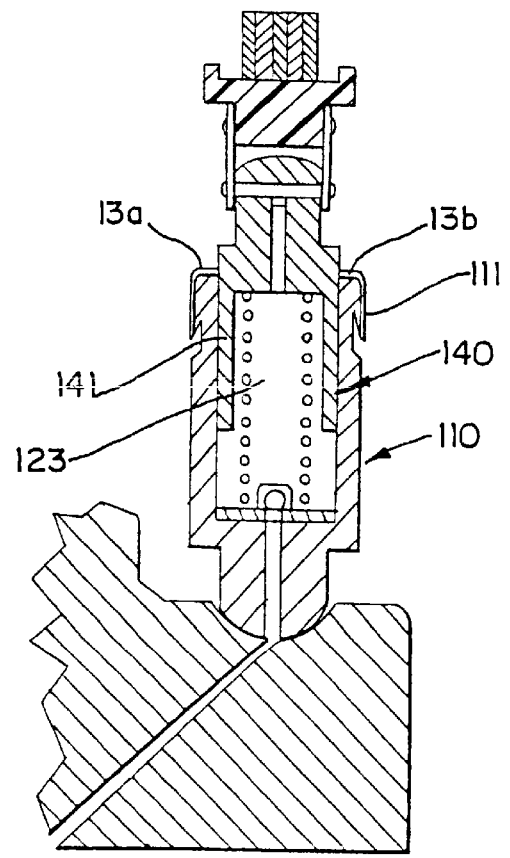
FIG. 4 is a side sectional view of the second embodiment of the hydraulic tensioner of the present invention.

In FIG. 4, a second embodiment of the hydraulic tensioner is illustrated. The tensioner 110 includes a spring clip rack 111. The piston 140 has rack grooves 141 formed along its outside surface. In this embodiment, the rack system prevents the piston 140 from being pushed into the chamber or bore 123 while the engine is stopped. Clips 13a and 13b press against the grooves formed in the piston 140 to prevent the piston 140 from being pushed inward. After the clips 13*a* and 13*b* pass the last groove, the clips 13*a* and 13*b* snap toward the minor diameter of the piston 140. The last groove is shaped as a step, rather than a wedge, so that clips 13*a* and 13*b* will catch in the last raised portion of the piston 140 and stop the piston 140 from leaving the tensioner.

Figure 5:
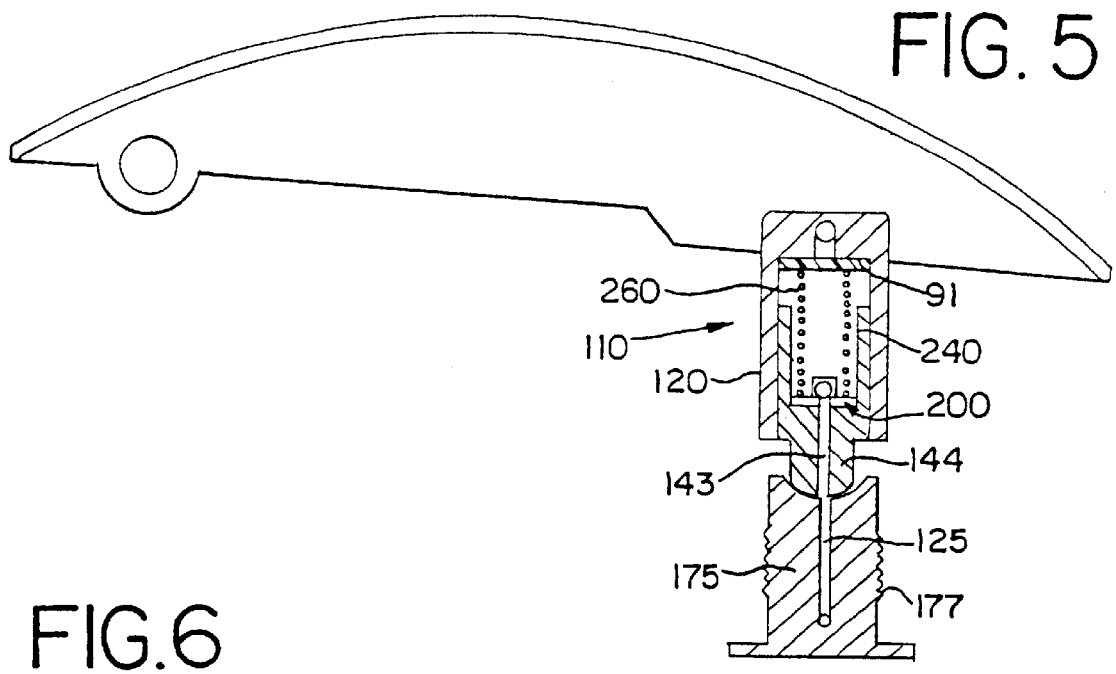
FIG. 5 is a front sectional view of the third embodiment of the hydraulic tensioner of the present invention mounted to a cartridge in the retracted position.

FIG. 5 illustrates the third embodiment of the hydraulic tensioner. In this embodiment, the sleeve is pivotally mounted to the tensioner arm and the piston is positioned against the mounting block. The mounting block incorporates an oil feed 125 that sends fluid through a passage 143 in the piston nose 144. The check valve 200 is located in the piston, rather than in the sleeve. The spring 260 biases the piston away from the sleeve, but is pressed against the check valve at the piston end and against a disc-shaped vent 91 at the sleeve end.

Figure 6:
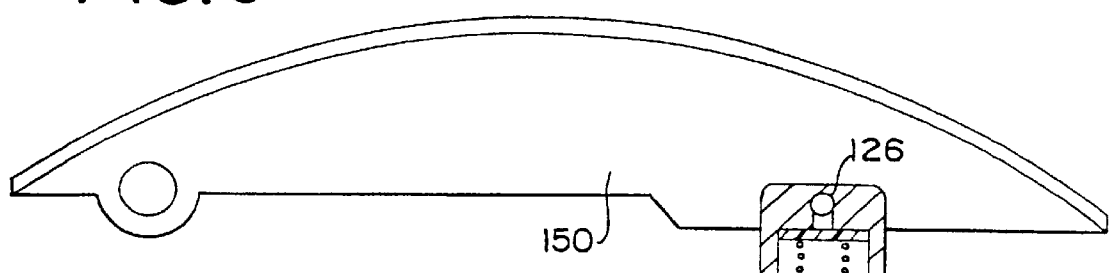
FIG. 6 is a front sectional view of the hydraulic tensioner of FIG. 7 in the extended position.
Figure 7:
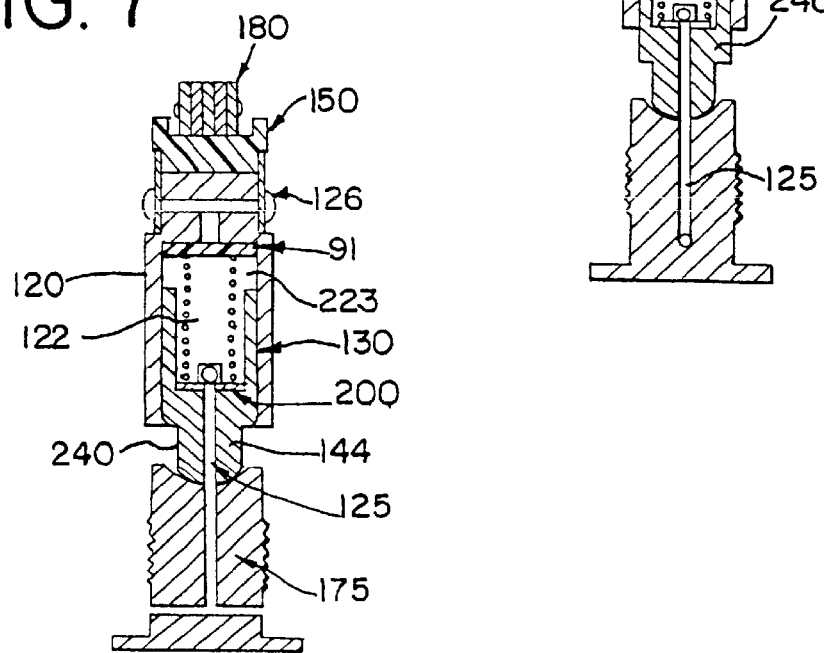
FIG. 7 is a side sectional view of the hydraulic tensioner of FIG. 5.

The piston 240 can be mounted to a mounting block or directly to the engine block. In FIGS. 5 and 6, the piston is mounted to a cartridge style tensioner body 175. The cartridge body has threaded groove 177 on its outside and can be threaded into the engine block or other mounting block or area. As shown in FIG. 6, the sleeve 120, which pivotally connects the tensioner arm 150 at pivot pin 126, extends outward to provide tension for a chain. By pinning the sleeve 120 to the tensioner arm 150, the tensioner and arm can be shipped as an assembly, and the number of components assembled onto the engine is reduced. In this tensioner, the sleeve moves relative to the piston 240, which is held against the mounting block. A side view of the third embodiment is shown is FIG. 7, where oil feed 125 flows through cartridge 175 into the piston nose 144. Check valve 200 permits fluid flow into the fluid chamber 122, while blocking back flow in the reverse direction. A retention ring 130 surrounds the piston 240. As the piston 240 extends, the ring 130 will expand into a groove 131 within the bore 223 and limit the relative movement of the sleeve 120 and piston to a predetermined amount. As a result, the piston 240 will stay with the sleeve 120 at all times. The chain 180 is guided by guide arm 150. The pivot pin 126 holds the guide arm 150 to the upper end of the sleeve.

Instead of a cartridge insert, the sleeve of piston may be mounted to a mounting block with the oil feed located within the mounting block. As an alterative to the mounting block, the sleeve or piston may be mounted directly onto the engine block with the oil feed running from the engine to the fluid chamber.

Figure 8:
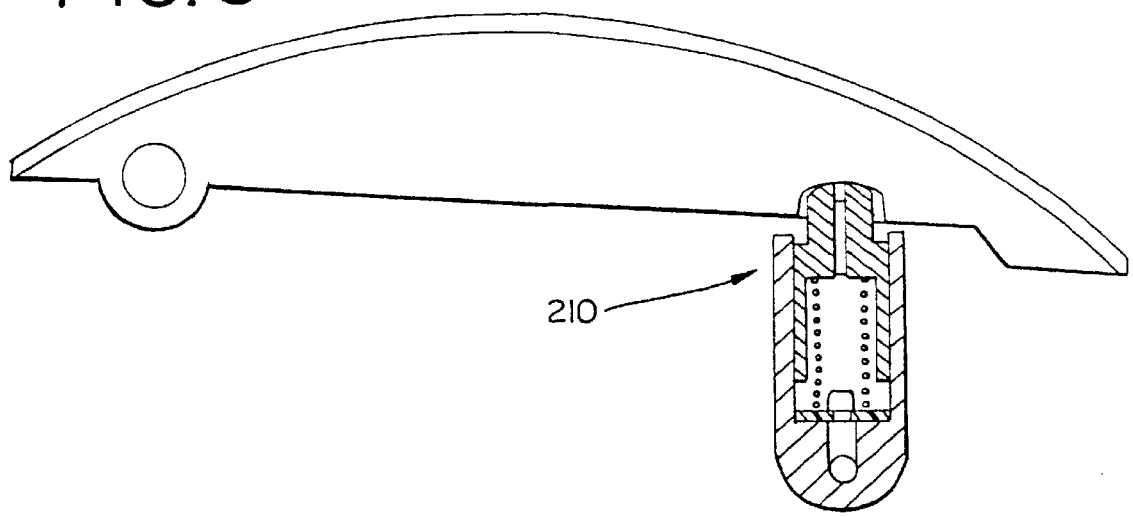
FIG. 8 is a front sectional view of the fourth embodiment of the hydraulic tensioner of the present invention in the retracted position.
Figure 9:
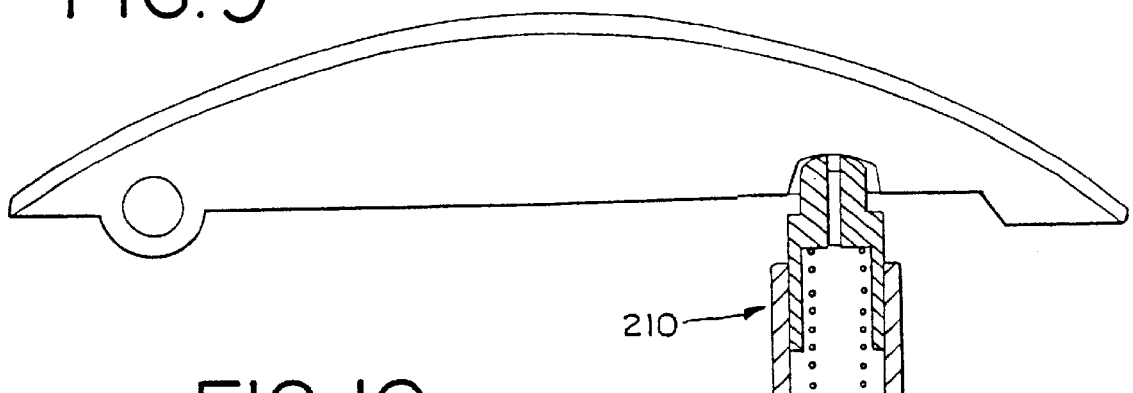
FIG. 9 is a front sectional view of the hydraulic tensioner of FIG. 8 in an extended position.
Figure 10:
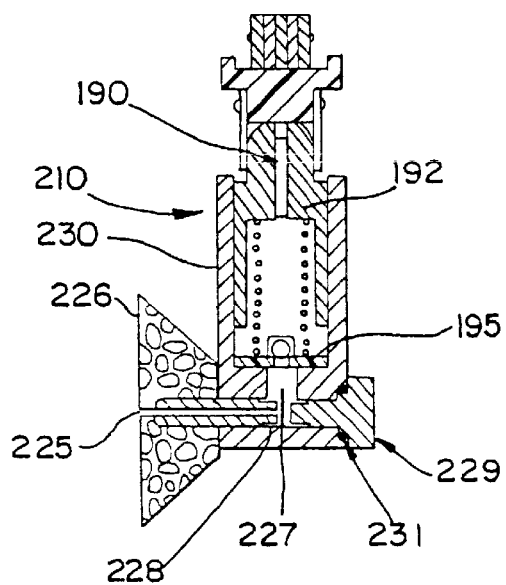
FIG. 10 is a side sectional view of the hydraulic tensioner of FIG. 8 contacting a mounting surface.

In another embodiment of the present invention, the piston is located in the conventional position within the sleeve or bore. The sleeve is pivotally connected to the block or other mounting means and the oil feed is within the mounting block. FIG. 8 illustrates tensioner 210 in the retracted position, and FIG. 9 illustrates tensioner 210 in an extended position. In FIG. 10, oil feed 225 is located within the mounting surface 226 and the passageway 227. A hole 228 is drilled through the bottom of the housing 230. The oil feed 225 enters the tensioner 210 at one end of the hole 228 and a pivot bolt 229 plugs the other end of the hole 228. An O-ring seal 231 is located around the pivot bolt to prevent the oil from escaping. This embodiment also includes a check valve 195 and a powdered metal vent tube 190 located within the upper end of the piston 192.

Figure 12:
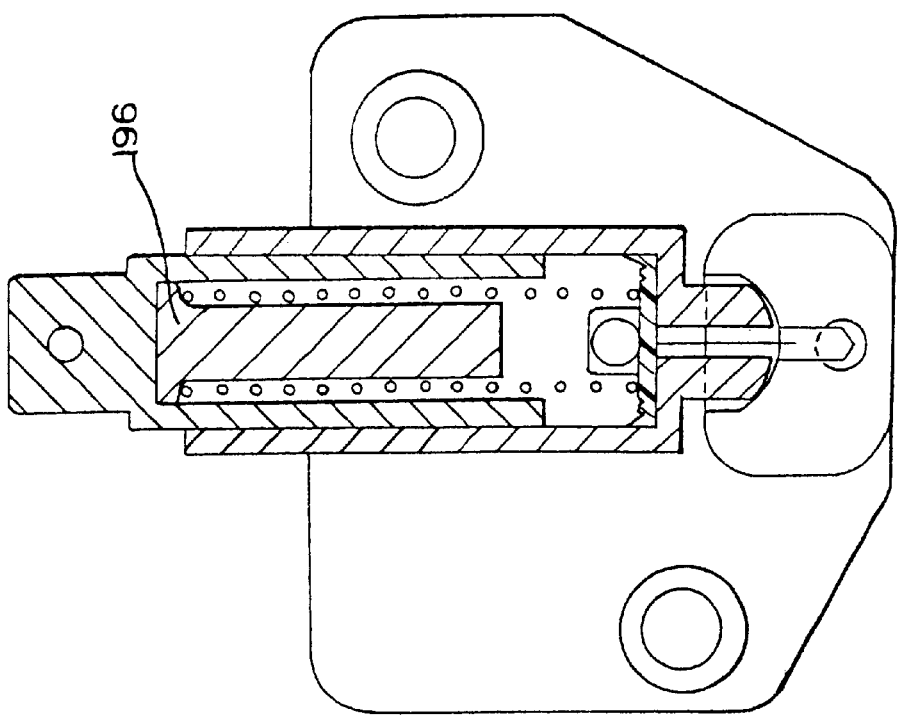
FIG. 12 is a front sectional view of the hydraulic tensioner of FIG. 11.
Figure 11:
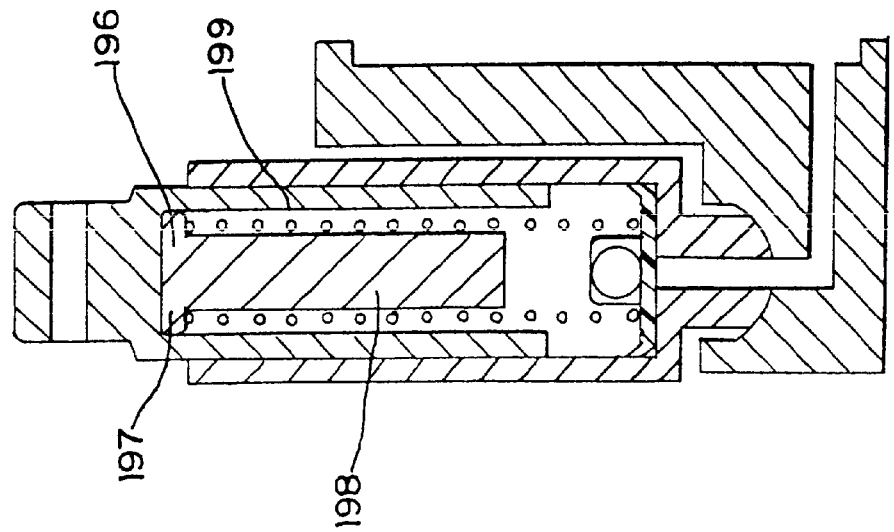
FIG. 11 is a side sectional view of a fifth embodiment of the hydraulic tensioner having an elongated vent disc.

In another alternative embodiment, the piston may include an extended length vent disc 196, as shown in FIGS. 11 and 12. The vent disc 196 has an upper end 197 with a spiral groove and a lower end 198 extending into the bore 199. Vent disc 196 having an extended lower end 198 reduces the total volume of oil required in the bore 199.

Figure 13:
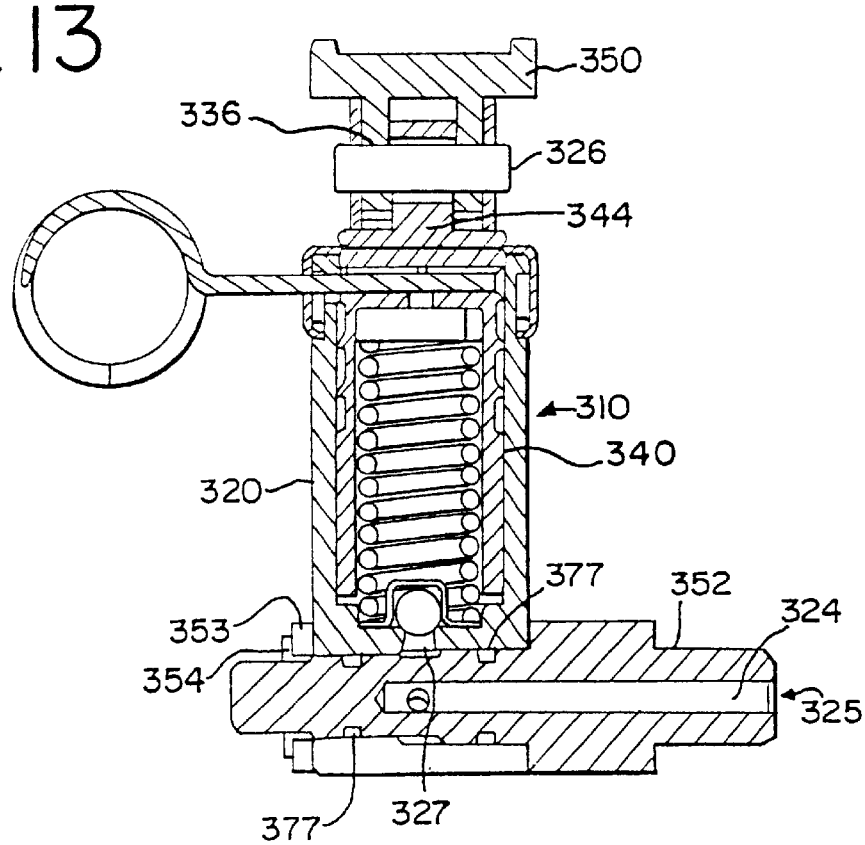
FIG. 13 is a side sectional view of a sixth embodiment of the hydraulic tensioner of the present invention illustrating a mounting pin assembly upon which the body of the tensioner is mounted.

In another alternate embodiment, shown in FIG. 13, tensioner 310, differs from the preceding embodiments in the manner by which the tensioner body is mounted to the engine. Tensioner 310 is mounted on a mounting pin assembly 352. One end of the mounting pin assembly 352 may be mounted to a mounting block or directly to an engine block and the other end is inserted through a mounting hole 328 (shown in FIGS. 16–19) formed near the bottom of the tensioner body or sleeve 320. The mounting pin assembly 352 extends through the mounting hole in the bottom of the tensioner body and is held in place by standard washer 353 and self-locking, retaining ring 354. The tensioner body is able to pivot around the central axis of the mounting pin assembly. Oil from an oil feed 325 flows through passageway 324 in the mounting pin assembly and then into opening 327 in the sleeve 320. O-ring seals 377 located around the mounting pin assembly 352 prevent oil from escaping.

In the embodiment shown in FIG. 13 as well as those shown in FIGS. 14–19, a tensioner arm 350 is pivotally attached to the closed end 344 of the piston 340 by a pivot pin 326 passing through pin hole 336. As the tensioner extends and retracts to control changing chain tension, the tensioner is allowed to pivot about the mounting pin assembly and the tensioner arm is allowed to pivot about the pivot pin.

Figure 14:
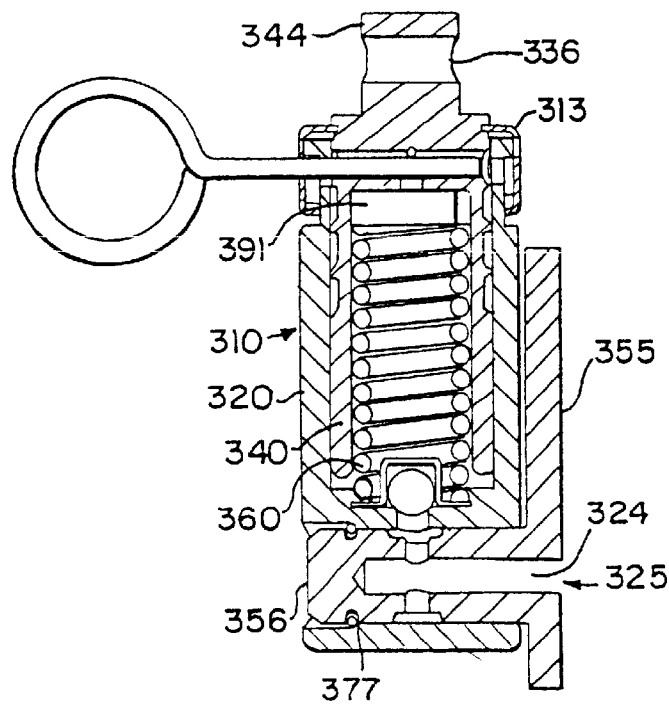
FIG. 14 is a side sectional view of the hydraulic tensioner shown in FIG. 13 with the mounting pin being an integral part of a mounting plate.

FIG. 14 illustrates the tensioner 310 described in FIG. 13 and differs in that tensioner 310 is mounted to the engine by mounting plate assembly 355 having an integral mounting pin 356. The mounting plate assembly 355 is attached to the engine block. The integral mounting pin 356 of the mounting plate assembly 355 is inserted into a mounting hole 328 (shown in FIGS. 16–19) formed in the bottom of the tensioner body or sleeve 320. The tensioner 310 is free to pivot about the integral mounting pin 356.

Pressurized oil from an oil feed 325 passes to the tensioner through passageway 324 located within the integral mounting pin 356. Oil ring seal 377 located around the integral mounting pin 356 prevents oil from escaping and may be designed to function as a retaining clip to lock the tensioner onto the integral mounting pin.

As in the preceding embodiments, oil pressure and the piston spring 360 bias the piston 340 in a protruding direction from the body 320. Clip 313 presses inwardly to engage grooves 341 formed on the outside of the piston 340 to provide a non-return function. Vent disc 391 located in an upper end of the fluid chamber near the piston 340 prevents oil from escaping but allows air to pass out of the tensioner. Pin hole 336 is formed at the top end of the piston 340 to allow pivotal connection of the piston 340 to a tensioner arm by a pivot pin (not shown). When the tensioner is connected to a tensioner arm by the pivot pin, the motion of the tensioner is limited to a direction perpendicular to the longitudinal axis of the pivot pin. Pin 301 secures the piston 340 to the tensioner body or sleeve 320 to reduce damage or loss of parts during shipping and assembly and is removed after assembly of the tensioner to the engine.

FIGS. 15–19 show various views of the same tensioner illustrated in FIG. 14. Common elements of the tensioner shown in FIGS. 14–19 share the same reference characters.

Figure 15:
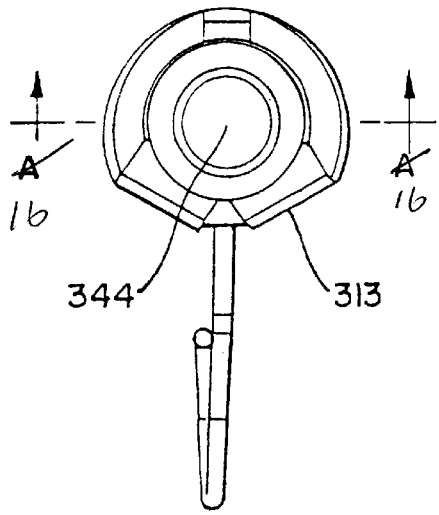
FIG. 15 is a top view of the hydraulic tensioner of FIG. 14 lacking the mounting plate.

FIG. 15 shows the top view of the tensioner shown in FIG. 14. In particular, the top 344 of the piston 340 has the clip 313 located around the outer perimeter of the piston top 344.

Figure 17:
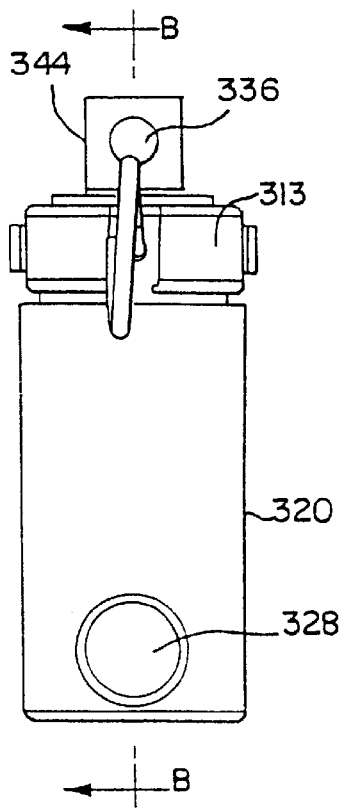
FIG. 17. is a front view of the hydraulic tensioner of FIG. 14 lacking the mounting plate and mounting pin.

FIG. 17 illustrates a front view of the tensioner shown in FIG. 14. In particular, the location of the pin hole 336 formed in the top of the piston 344 is shown. The mounting hole 328 is formed in the bottom of the tensioner body or sleeve 320. In this illustration, the axes of the pin hole 336 and the mounting hole 328 are parallel to each other. Also, the clip 313 is located around the piston, leaving space for pin 301 to pass therethrough. Pin 301 engages and secures the piston 344 in a retracted position until application of the tensioner to an engine.

Figure 16:
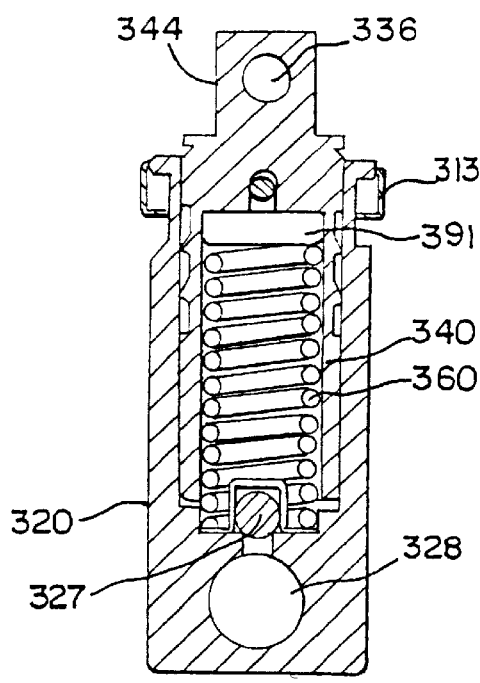
FIG. 16 is a front sectional view of FIG. 15 along line A—A.
Figure 18:
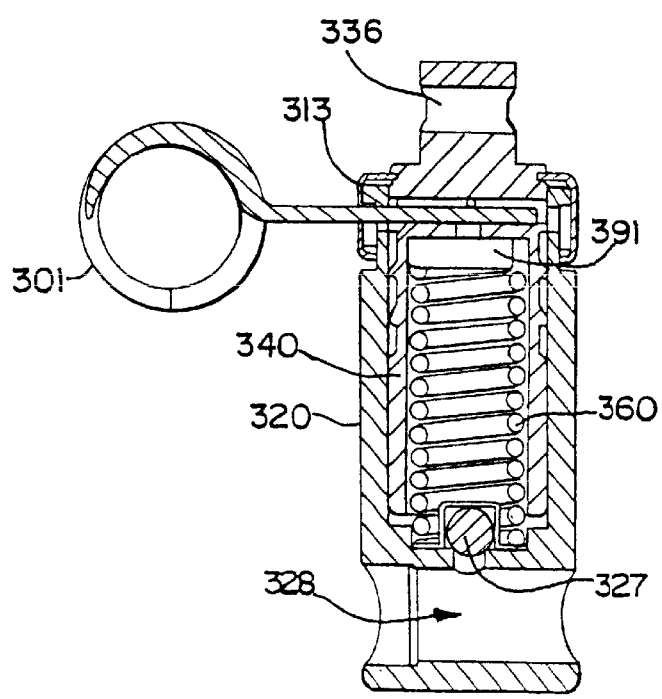
FIG. 18 is a side sectional view of FIG. 17 along line B—B.

FIG. 16 illustrates a front sectional view of the tensioner shown in FIG. 15 through line A—A. FIG. 18 illustrates a side cross sectional view of the tensioner shown in FIG. 17 through line B—B. Thus, in FIGS. 16 and 18, the tensioner body 320 has a mounting hole 328 formed at a bottom end. The tensioner body or sleeve 320 slidably receives piston 340 forming a fluid chamber therebetween. Passageway 327 allows oil from a pressurized fluid source (not shown) to enter into the fluid chamber. Piston 340 is biased outwardly by a piston spring 360 residing in the fluid chamber. Vent disc 391 located in an upper end of the fluid chamber adjacent the closed end of the piston and allows air to pass out more easily than fluid.

Figure 19:
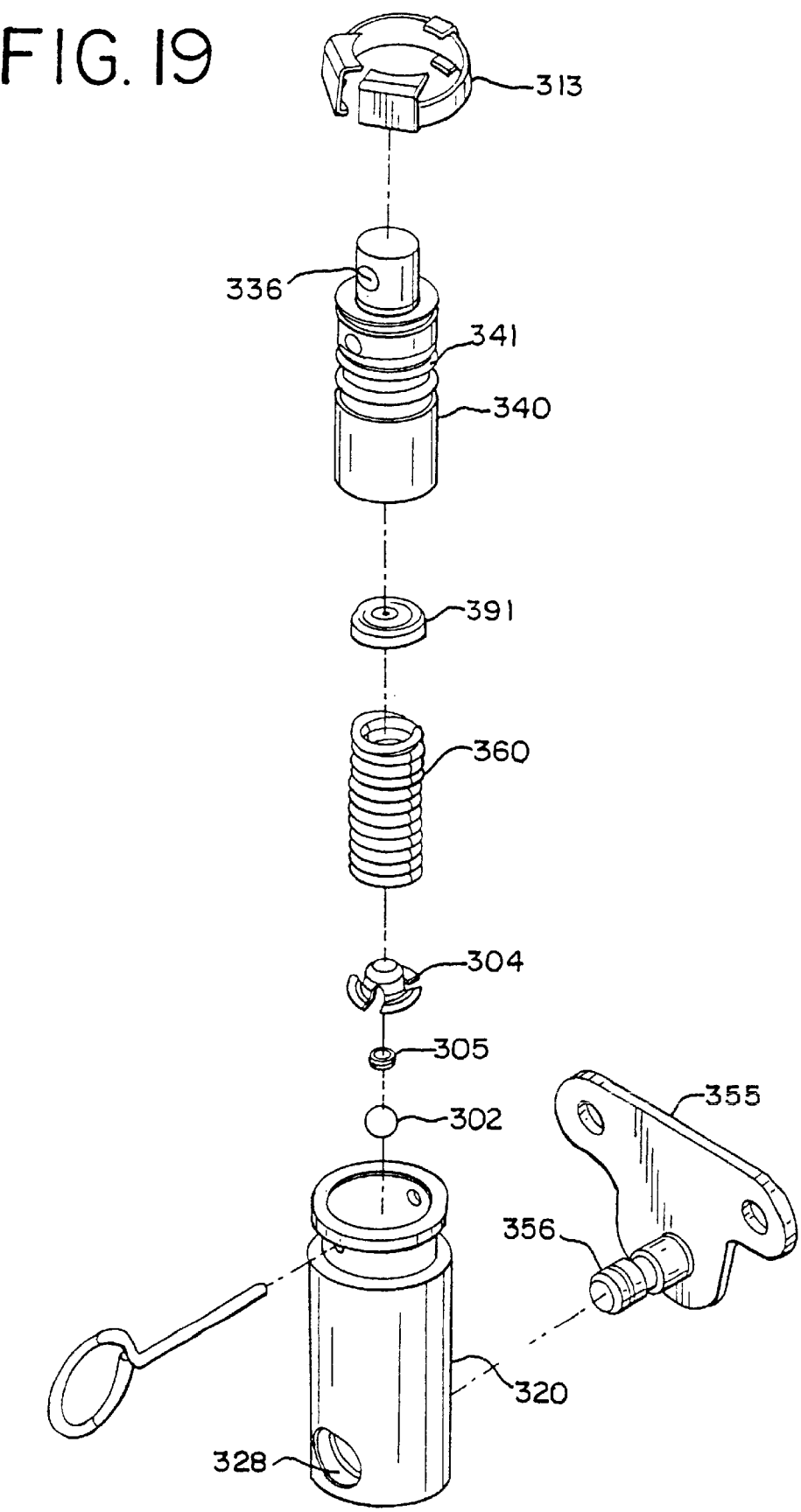
FIG. 19 is an exploded, perspective view of the hydraulic tensioner of FIG. 14.

FIG. 19 illustrates the tensioner and mounting plate assembly of FIG. 14 in an exploded perspective view. In particular, the tensioner includes a tensioner body or sleeve 320 having an open end and a bottom end. A mounting hole 328 is formed in the bottom end of the sleeve 320. A piston 340 is slidably received in the open end of the sleeve 320 and defines a fluid chamber therebetween. A piston spring 360 is disposed between the piston 340 and sleeve 320 biasing the piston 340 in a protruding direction. Pin hole 336 is formed through a closed end of the piston 340. Clip 313 located around the outside of the piston 340 engages grooves 341 to provide a non-return function. Integral mounting pin 356 which is a pin-shaped portion of mounting plate assembly 355 is inserted into mounting hole 328 to pivotally support the tensioner. When mounted upon the integral mounting pin 356 the tensioner is constrained to pivot in a direction perpendicular to the longitudinal axis of the pin. Vent disc 391 is located in the fluid chamber to control the loss of fluid pressure and selectively allow gas to exit the fluid chamber. A check valve including ball 302, spring 305, and plate 304 located within the fluid chamber permits fluid to enter and prevents fluid loss from the fluid chamber.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a generally cylindrical hollow piston having a closed end, a generally cylindrical hollow body having a closed end and an open end, and being slidably received around said piston, said hollow piston being received in said open end of said body to form a fluid chamber with said body, said piston having a fluid passage to permit fluid flow into said hollow body from a reservoir;

a spring positioned to bias said body in a protruding direction from said piston; and, said body having a pivot connection at said closed end to permit attachment of said body to a tensioner arm said piston being pivotally mounted to an engine.

2. The hydraulic tensioner of claim 1 wherein said body includes a pivot pin disposed within said pivot connection to pivotally mount a tensioner arm.

3. The hydraulic tensioner of claim 2 wherein said closed end of said piston is pivotally mounted on a mounting pin, said mounting pin being mounted to said engine.

4. The hydraulic tensioner of claim 1 wherein said closed end of said piston includes a fluid passage to permit fluid flow into said hollow body.

5. The hydraulic tensioner of claim 4 wherein said closed end of said piston is spherically-shaped and is pivotally mounted to said engine by being received in a spherically-shaped body.

6. A The hydraulic tensioner of claim 5 wherein said spherically-shaped body is mounted to an engine block, said spherically-shaped body providing a fluid passage from said reservoir to said fluid passage in said piston.

7. The hydraulic tensioner of claim 6 wherein said spherically-shaped body is located within a tensioner housing.

8. The hydraulic tensioner of claim 7 further comprising an O-ring seal positioned between the spherically-shaped body and said spherically-shaped end of said piston.

9. The hydraulic tensioner of claim 1 wherein said check valve is located in said hollow body near said closed end of said body.

10. The hydraulic tensioner of claim 1 wherein an expandable retention ring surrounds said piston, said body including a groove for retaining said retention ring at an uppermost position of said piston within said body.

11. The hydraulic tensioner of claim 1 wherein a check valve positioned within said fluid passage between the chamber and said reservoir to permit fluid flow into the fluid chamber while blocking flow in the reverse direction.

12. The hydraulic tensioner of claim 1 wherein said spring is positioned within said hollow piston and said body.

13. The hydraulic tensioner of claim 1 wherein said fluid passage is formed in said closed in of said piston.

14. A hydraulic tensioner comprising:

a generally cylindrical hollow piston having a closed end, a generally cylindrical hollow body having a closed end and an open end, and being slidably received around said piston to form a fluid chamber therebetween, said piston having a fluid passage to permit fluid flow into said hollow body;

a spring positioned within said hollow piston and said body, said spring biasing said body in a protruding direction from said piston; and, a check valve positioned within said fluid passage between the chamber and a reservoir to permit fluid flow into the fluid chamber while blocking flow in the reverse direction;

said body having a pivot connection at said closed end to permit attachment of said body to a tensioner arm;

said piston being pivotally mounted relative to an engine.

15. The hydraulic tensioner of claim 14 wherein said fluid passage is formed in said closed in of said piston.

16. The hydraulic tensioner of claim 14 wherein said closed end of paid piston is spherically-shaped and is pivotally mounted to said engine by being received in a spherically-shaped body.

17. The hydraulic tensioner of claim 16 wherein said spherically-shaped body is mounted to an engine block, said spherically-shaped body providing a fluid passage from said reservoir to said fluid passage in said piston.

18. The hydraulic tensioner of claim 17 wherein said spherically-shaped body is located within a tensioner housing.

19. The hydraulic tensioner of claim 18 further comprising an O-ring seal positioned between the spherically-shaped body and said spherically-shaped end of said piston.

* * * * *